(12) United States Patent
Niemann et al.

(10) Patent No.: US 10,935,522 B2
(45) Date of Patent: Mar. 2, 2021

(54) SENSOR DEVICE FOR DETECTING MOISTURE ON A ROADWAY HAVING AT LEAST ONE STRUCTURE-BORNE SOUND SENSOR

(71) Applicant: Hella KGaA Hueck & Co., Lippstadt (DE)

(72) Inventors: Thomas Niemann, Delmenhorst (DE); Klaas Hauke Baumgartel, Delmenhorst (DE); Bastian Kanning, Bremen (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 423 days.

(21) Appl. No.: 15/443,719

(22) Filed: Feb. 27, 2017

(65) Prior Publication Data

US 2017/0248552 A1 Aug. 31, 2017

(30) Foreign Application Priority Data

Feb. 29, 2016 (DE) .......................... 102016002343.0

(51) Int. Cl.
*G01N 29/22* (2006.01)
*G01N 29/14* (2006.01)
*G01M 17/00* (2006.01)

(52) U.S. Cl.
CPC .......... *G01N 29/222* (2013.01); *G01M 17/00* (2013.01); *G01N 29/14* (2013.01); *G01N 29/223* (2013.01); *G01N 2291/02845* (2013.01)

(58) Field of Classification Search
CPC .... G01N 29/222; G01N 29/14; G01N 29/223; G01N 2291/024845; G01M 17/00

(Continued)

(56) References Cited

U.S. PATENT DOCUMENTS 5,521,594 A * 5/1996 Fukushima ........ B60G 17/0165
180/167
2004/0155764 A1* 8/2004 Ichinose ............. B60C 23/0408
340/447

(Continued)

FOREIGN PATENT DOCUMENTS

DE 4213221 A1 10/1993
DE 19543137 A1 5/1997

(Continued)

*Primary Examiner* — Nimeshkumar D Patel
*Assistant Examiner* — Nashmiya S Fayyaz
(74) *Attorney, Agent, or Firm* — Muncy, Geissler, Olds & Lowe, P.C.

(57) ABSTRACT

In a sensor device for detecting moisture on a roadway of a vehicle, particularly a motor vehicle, with at least one structure-borne sound sensor, with at least one circuit carrier, wherein the structure-borne sound sensor is connected in a signal-conducting manner to the circuit carrier, it is provided in a manner important for the invention that at least one structure-borne sound sensor is arranged in a housing, that the housing has at least one flat constructed housing area, that the structure-borne sound sensor is connected to the flat constructed housing area, so as to conduct structure-borne sound signals, and in that the housing is constructed as a resonant body, that the at least one circuit carrier is arranged in the housing, that the housing is provided for mounting in a wheel arch of a vehicle, that at least one connecting means for producing a connection between the housing and the wheel arch is assigned to the housing, and that the connecting means is constructed to be vibration damping, at least in certain sections.circuit carrier.

15 Claims, 4 Drawing Sheets

(58) Field of Classification Search
USPC .................................. 73/649, 866.5, 493
See application file for complete search history.

(56) References Cited

U.S. PATENT DOCUMENTS

| | | | | |
|---|---|---|---|---|
| 2012/0240680 | A1* | 9/2012 | Urase | G01S 7/521 |
| | | | | 73/632 |
| 2016/0221581 | A1* | 8/2016 | Talwar | B60W 40/06 |
| 2018/0065640 | A1* | 3/2018 | Barthel | B60T 8/172 |
| 2018/0265054 | A1* | 9/2018 | Hofmann | B60T 8/172 |

FOREIGN PATENT DOCUMENTS

| | | |
|---|---|---|
| DE | 4235809 C2 | 7/1997 |
| DE | 19745684 A1 | 4/1999 |
| DE | 102004023323 A1 | 12/2005 |
| DE | 102010063017 A1 | 6/2012 |
| DE | 102012221518 A1 | 5/2014 |

* cited by examiner

SENSOR DEVICE FOR DETECTING MOISTURE ON A ROADWAY HAVING AT LEAST ONE STRUCTURE-BORNE SOUND SENSOR

This object is achieved using a sensor device by the present invention. Advantageous embodiments of the invention are described in the exemplary embodiments defined herein. Furthermore, the invention relates to a vehicle having the features defined herein.

BACKGROUND OF THE INVENTION

Field of the Invention

The invention relates to a sensor device for detecting moisture on a roadway of a vehicle, particularly a motor vehicle, having at least one structure-borne sound sensor and having at least one circuit carrier, wherein the structure-borne sound sensor is connected in a signal-conducting manner to the circuit carrier.

Brief Description of the Related Art Sensor devices of the type mentioned at the beginning are known and are used in a wide range of vehicles. In particular, the sensor devices are used for the early detection of roadway wetting with moisture, that is to say for the early detection of a risk of aquaplaning.

For example, a method in a driver assistance system for detecting wetness on a roadway is known from DE 10 2010 063 017 A1. Here, the wetness on a roadway is detected using a rear camera. At the rear of the vehicle, an image is taken of an area located behind the rear. The recorded image is analysed with regards to a spray trail created by the vehicle. Based on the analysis, a wetness signal is output for triggering an automatic reaction of the driver assistance system to the wet roadway.

Furthermore, a sensor device and a method in a vehicle for detecting the state of the road surface is known from DE 10 2004 023 323 A1. In this method, the radiation emanating from an area on the road surface is detected by means of a radiation receiver. The measured radiation values are processed further and used for controlling a driving-conditions controller.

The disadvantage of known methods and devices is the fact that these methods and devices can be very complicated and therefore cost-intensive and susceptible to faults. Furthermore, in many systems an adaptation of the sensor device to the actual vehicle type is necessary, which makes the production and assembly more difficult.

SUMMARY OF THE INVENTION

The invention is based on the object of suggesting a sensor device of the type mentioned at the beginning, using which a precise, simple and vehicle-type-independent detection of roadway wetting is enabled.

This object is achieved using a sensor device with the features of Patent Claim 1. Advantageous embodiments of the invention are described in the dependent claims. Furthermore, the invention relates to a vehicle having the features of Patent Claim 7.

In a sensor device for detecting moisture on a carriageway of a vehicle, particularly a motor vehicle, with at least one structure-borne sound sensor and with at least one circuit carrier, wherein the structure-borne sound sensor is connected in a signal-conducting manner to the circuit carrier, it is provided in a manner important for the invention that at least one structure-borne sound sensor is arranged in a housing, that the housing has at least one flat constructed housing area, that the structure-borne sound sensor is connected to the flat constructed housing area, so as to conduct structure-borne sound signals, and that the housing is constructed as a resonant body, that the at least one circuit carrier is arranged in the housing, that the housing is provided for mounting in a wheel arch of a vehicle, that at least one connecting means for producing a connection between the housing and the wheel arch is assigned to the housing, and that the connecting means is constructed to be vibration damping, at least in certain sections.

Structure-borne sound signals, vibrations in particular, can be detected on a body by means of a structure-borne sound sensor. The vibrations may for example be created by impacting bodies, such as for example water droplets or spray water droplets. Spray water thrown up by a tyre can be detected via these vibrations by means of a structure-borne sound sensor. To this end, the sensor device has at least one structure-borne sound sensor, which is connected in a signal-conducting manner to a circuit carrier. An analysis device can for example be arranged on the circuit carrier, in which analysis device the detected structure-borne sound signals can be analysed. Furthermore, signal transmission devices can be arranged on the circuit carrier, which for example forward the analysed or else non-analysed signals to a further processing device for example via a radio connection or a cable connection. The structure-borne sound sensor and the circuit carrier are arranged in a housing. The housing is preferably constructed in such a manner that it protects the structure-borne sound sensor and the circuit carrier from external environmental influences, such as moisture for example. The housing has at least one housing area which is constructed flat. This housing area is preferably provided so that water droplets, particularly spray water droplets thrown up from the roadway, impact onto this area. The spray water droplets induce vibrations in the flat constructed housing area, which vibrations propagate as a structure-borne sound signal on the flat constructed housing area and therefore on the entire housing. The structure-borne sound sensor has a structure-borne-sound-signal-conducting connection to the flat constructed housing area. Thus, the vibrations generated by the impact of the spray water droplets can be detected by the structure-borne sound sensor. The housing has a cavity, so that the housing forms a resonant body. The formation of a resonant body causes an amplification of the vibrations and thus of the structure-borne sound signals. The amplification of the structure-borne sound signal enables an improved detection of the structure-borne sound signals and therefore an improved detection of the impact events causing the structure-borne sound signals. By analysing the structure-born sound signals, it is possible for example to draw a conclusion about the number of impacting spray water droplets. It is possible to draw a conclusion about the state of wetness of the roadway from that. The compact arrangement of the structure-borne sound sensor and the circuit carrier in one housing makes the sensor device independent of the vehicle type in which the sensor device is used. The detection of the spray water droplets takes place by means of the impact on the flat constructed housing area, which is independent of the vehicle type. Thus, simple mounting and even subsequent mounting is enabled.

The housing is provided for mounting in a wheel arch of a vehicle. In the case of mounting in a wheel arch of a vehicle, it is possible, particularly on the interior lining of a wheel arch, for the flat constructed area of the housing to be aligned in such a manner that spray water droplets, which are thrown up by the front tyres for example, impact onto the flat housing area. For mounting, the housing may for example have openings for guiding through screw connections or connecting means for producing a connection to the wheel arch. The connecting means can in this case be constructed in such a manner that the connecting means has a damping action with respect to the vibrations or oscillations transmitted from the vehicle to the sensor device. The connecting means may for example be an adhesive agent for forming an adhesive connection or latching connectors for producing a latching connection to an arranged damping element. Therefore, decoupling between the vehicle and the sensor device is achieved. For example, the connection between the housing and the wheel arch can be produced using the wall of the housing facing away from the flat constructed housing area. The wheel arch may for example also be the mudguard of a motorcycle.

In a development of the invention, the structure-borne sound sensor has an extensive contact with the housing area which is constructed to be flat and the structure-borne sound sensor is arranged on the side of the housing area facing the housing interior. The housing of the sensor device is preferably aligned in such a manner that the spray water thrown up by the tyres of a vehicle impact onto the flat constructed housing area. The spray water which is thrown up, particularly the spray water droplets, cause vibrations on the housing area which is constructed to be flat, so that structure-borne sound signals propagate on the housing area. Due to an extensive contact between the structure-borne sound sensor and the flat constructed housing area, there is an optimum transmission of the structure-borne sound signals to the structure-borne sound sensor. In particular, the structure-borne sound sensor is arranged on the inside of the housing area, that is to say on the side of the housing area facing the housing interior. As a result, the structure-borne sound sensor is connected to the flat constructed housing area in a structure-born-sound conducting manner and is additionally protected from external influences by the housing.

In a development of the invention, at least one structure-borne sound sensor is a piezoelectric element, particularly a piezoelectric film. A piezoelectric element, particularly a piezoelectric film is available inexpensively and can easily be adapted to the required conditions. In particular, the piezoelectric film can be adhesively bonded to the inside of the flat constructed housing area, so that there is a good transmission of the structure-borne sound signals to the piezoelectric film.

In a constructive development of the invention, the circuit carrier is connected to the housing in a vibration-damped manner. When using the sensor device in a vehicle in particular, for example in the wheel arch of a vehicle, the sensor device may be exposed to strong vibrations and shocks. In order to protect the electronic components which may be arranged on the circuit carrier, the circuit carrier is connected to the housing in a vibration-damped manner. Shocks which act on the housing are damped by means of the vibration-damped connection, which is produced by means of damping elements, for example by means of rubber dampers, so that the circuit carrier is protected.

In a constructive development of the invention, the circuit carrier is only connected to the housing at the edges of the circuit carrier. A vibration-damped connection between the circuit carrier and the housing may result in that the circuit carrier is only connected to the housing at the edges of the circuit carrier. For example, the circuit carrier can be arranged centrally in the housing, so that the upper side and the underside of the circuit carrier does not have any direct contact to the inner wall of the housing. The connection of the edges of the circuit carrier to the housing inner wall can be constructed in a vibration-damped manner. Because the upper side and the underside of the circuit carrier do not have any contact to the inner wall of the housing, there is a considerable reduction in vibration transmission from the housing to the circuit carrier.

In an embodiment of the invention, at least one connecting means is constructed for producing an adhesive connection between the housing and a wheel arch and at least one connecting means consists of a foamed material at least in certain sections. The foamed material can for example be a foamed plastic, in particular an elastic foamed plastic, particularly a foam. A particularly good vibration-damping property of the adhesive connection is achieved by using a foamed material.

In a development of the invention, the adhesive connection is constructed by a connecting means, which is constructed flat, and the connecting means has an adhesive film at least on one side. The connecting means may for example be a foamed plastic, which is provided with a self-adhesive film on one side, preferably on both sides. Thus, the connecting means can be used for the simple mounting of the housing in the wheel arch. For example, the connecting means can be formed by a foamed adhesive pad.

In a development of the invention, the housing is constructed for mounting in at least one opening of a wheel arch. For example, an opening for mounting the housing of a sensor device can be provided in a wheel arch of a vehicle. In particular, the housing of the sensor device can be inserted into the opening with a precise fit, so that the flat constructed housing area, on which the structure-borne sound sensor is arranged, is arranged in an areally flush manner to the inner wall of the wheel arch.

In a development of the invention, the housing has at least one lateral protrusion and at least one connecting means is arranged on at least one lateral protrusion for producing a connection between the housing and the wheel arch. For example, a wheel arch can have an opening for mounting the housing of the sensor device. To this end, the housing can be inserted into the opening of the wheel arch in certain sections. The housing has a flat constructed housing area, on the housing-interior-facing side of which the structure-borne sound sensor is arranged. For example, the flat constructed area may form a base surface, particularly an end face of the housing, parallel to which a second base surface is arranged. In addition, the housing can have side walls connecting the base surfaces. For example, the base services may be constructed to be circular. The lateral protrusion protrudes beyond the base surfaces, preferably parallel to the planes spanned by the base surfaces. The protrusion is preferably arranged in the region of the base surface not having the structure-borne sound sensor. For example, the lateral protrusion can also be constructed such that the base surface not having the structure-borne sound sensor has a larger surface area than the base surface having the structure-borne sound sensor. The lateral protrusion of the housing preferably forms an overlap with the edge region of the opening of the wheel arch, so that the housing can be fastened on the wheel arch.

In a development of the invention, the plane spanned by the lateral protrusion and the plane spanned by the flat constructed area are arranged parallel to one another. Due to the parallel arrangement of the planes of the flat constructed area and of the lateral protrusion, a parallel arrangement of the flat constructed area and thus of the structure-borne sound sensor and the inner wall of the wheel arch is enabled.

In a vehicle, particularly a motor vehicle, having at least two axles, having at least two wheels, having at least one wheel arch surrounding at least one wheel at least in certain sections and having at least one sensor device according to the invention, it is provided in a manner important to the invention that at least one sensor device is arranged in at least one wheel arch and that the sensor device is connected by means of at least one connecting means to the wheel arch and that the connecting means is constructed in a vibration damping manner. The sensor device according to the invention with a structure-borne sound sensor, a circuit carrier and a housing surrounding the structure-borne sound sensor and the circuit carrier is provided to detect moisture on a roadway, particularly the state of wetness of the roadway, on which the vehicle is moving. To this end, the housing of the sensor device is arranged in such a manner that it is exposed to the spray water thrown up from the roadway. The spray water droplets impacting onto the housing, particularly onto the flat housing area of the housing, excite vibrations in the flat area, which can be detected as structure-borne sound signals by the structure-borne sound sensor. In particular, the moisture on a roadway is thrown up by the tyres of the vehicle in the form of spray water. In order to enable a detection of the spray water that is thrown up in as precise a manner as possible, the sensor devices are arranged in the wheel arches of the vehicle, particularly on the interior lining of the wheel arches. The spray water thrown up by the tyres, particularly the spray water thrown up when travelling straight on, impacts onto the interior lining of the wheel arches. A detection of the spray water is enabled by means of the arrangement of the sensor device on the inner lining of the wheel arches. The housing is connected to the wheel arch by means of at least one connecting means. For example, the connecting means may be formed by an adhesive agent or else by latching connectors. The connecting means is here constructed in a vibration damping manner, so that there is decoupling between the vehicle and the sensor device. In the construction of the connecting means as latching connector, the damping action can for example be achieved by means of the arrangement of an additional damping element.

In a development of the invention, the flat constructed housing area of the housing is arranged in the wheel arch facing a running surface of a wheel and the sensor device is arranged counter to the direction of travel of the vehicle behind the wheel. The flat constructed housing area is provided so that spray water that is thrown up impacts onto the housing area and that vibrations are excited in the housing area. When travelling straight on in particular, the spray water is thrown up on the side of the tyre facing away from the direction of travel. In order to detect this spray water, the sensor device is arranged in a wheel arch in such a manner that the flat constructed housing area faces a running surface of a wheel. A portion of the spray water droplets thrown up by the running surface of the wheel impact onto the flat constructed housing area and generate structure-borne sound signals on the same, which are detected by the structure-borne sound sensor.

In a development of the invention, the flat constructed area of the sensor device is inserted into an opening in a wheel arch at least in certain sections, the housing has a lateral protrusion, the lateral protrusion of the housing forms an overlap with the wheel arch and the connecting means is arranged between the wheel arch and the lateral protrusion. Because the lateral protrusion forms an overlap with the edge region of the opening of the wheel arch, the housing can easily be inserted into the opening of the wheel arch. A connecting means is arranged between the lateral protrusion of the housing and the wheel arch. In particular, the connecting means is a vibration-damping adhesive connection, for example in the form of a foamed plastic. The foamed plastic can be constructed to be flat and provided with an adhesive film on both sides, so that a simple mounting of the housing in the opening of the wheel arch is enabled. Preferably, the dimensions, particularly the distance between the flat constructed area and the lateral protrusion along the side wall, are chosen in such a manner that the distance corresponds to the wall thickness of the wheel arch, so that the flat constructed area in the installed state is flush to the inner wall of the wheel arch.

In a development of the invention, the sensor device is arranged in the region of the wheel arch which is close to the roadway. The wheel arch surrounds the wheel of a vehicle at least in certain sections. Preferably, the sensor device is arranged in the region of the base plate of the vehicle, that is to say in the region of the wheel arch which is close to the roadway. A large portion of the spray water thrown up by the tyres is to be expected in this area. Due to the arrangement in this region close to the roadway, a sufficiently good detection of spray water is to be expected even in the case of low wetting of the roadway surface.

In an embodiment of the invention, the sensor device is connected to the wheel arch by means of an adhesive connection and the adhesive connection is constructed in a vibration damping manner. By using an adhesive connection, a particularly simple, cost-effective and time-saving option for mounting the sensor device in a wheel arch results. Because the adhesive connection has vibration damping properties, the transmission of vibrations, which arise during driving of the vehicle, to the sensor device is reduced. For example, an elastic adhesive can be used for this, wherein the adhesive connection has a satisfactory strength in order to achieve the damping properties. Due to the vibration-damped mounting, the electronic components of the sensor device are protected, so that the susceptibility of the sensor device to faults is reduced.

BRIEF DESCRIPTION OF THE DRAWING

The invention is explained further below with reference to an exemplary embodiment which is illustrated in the drawing. In detail, in the schematic illustrations.

DETAILED DESCRIPTION OF THE PREFERRED EMBODIMENTS

Figure 1:
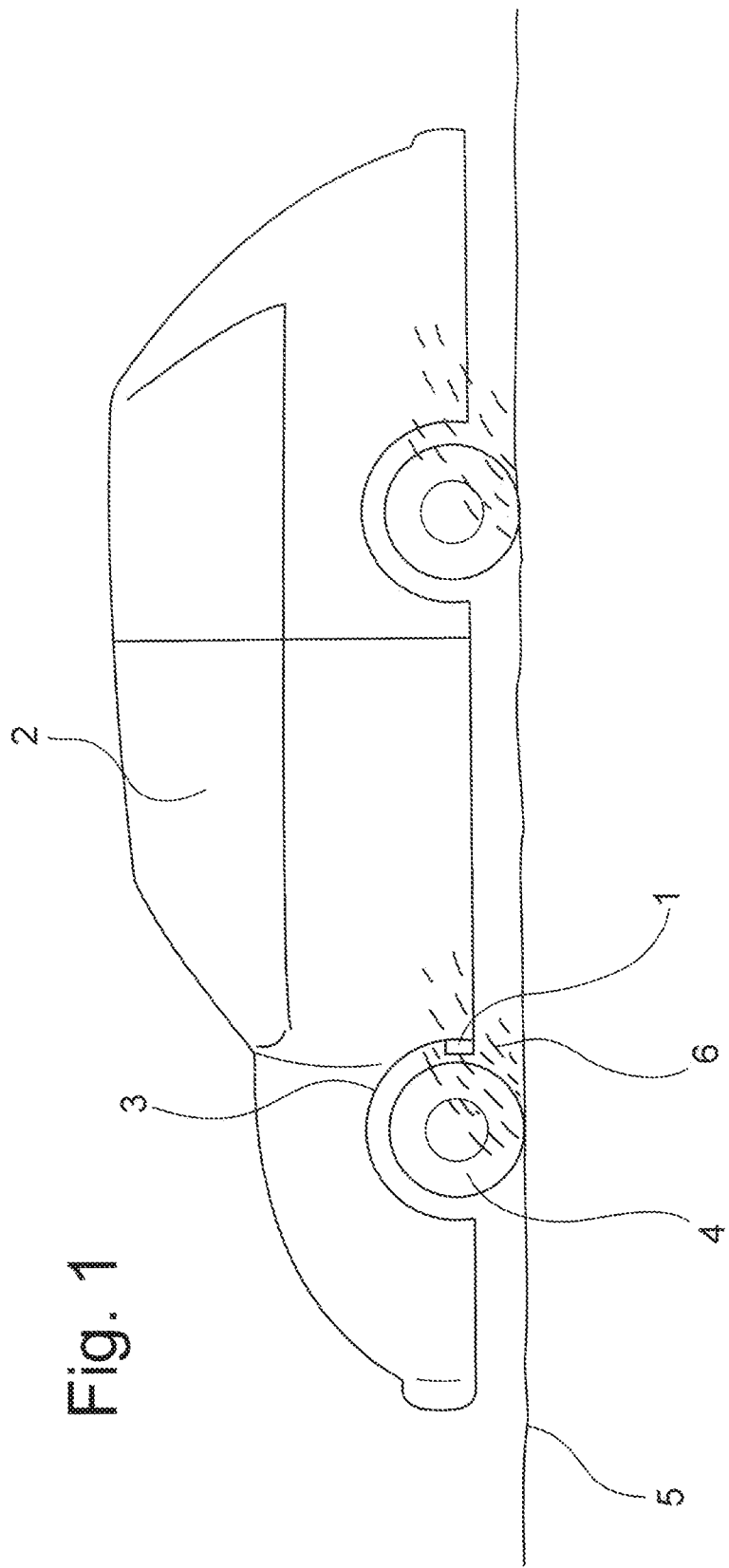
FIG. 1: shows the arrangement of a sensor device on a vehicle.

In FIG. 1, the arrangement of a sensor device 1 according to the invention on a vehicle 2 is illustrated. In particular, the sensor device 1 is arranged in a wheel arch 3 of the vehicle 2. The wheel arch 3 surrounds a wheel 4 in certain sections, from which wheel moisture from the wetted roadway 5 is thrown up in the form of spray water 6. The spray water droplets 6 impact onto the sensor device 1 and generate structure-borne sound signals on the same, which are detected by the sensor device 1.

Figure 2:
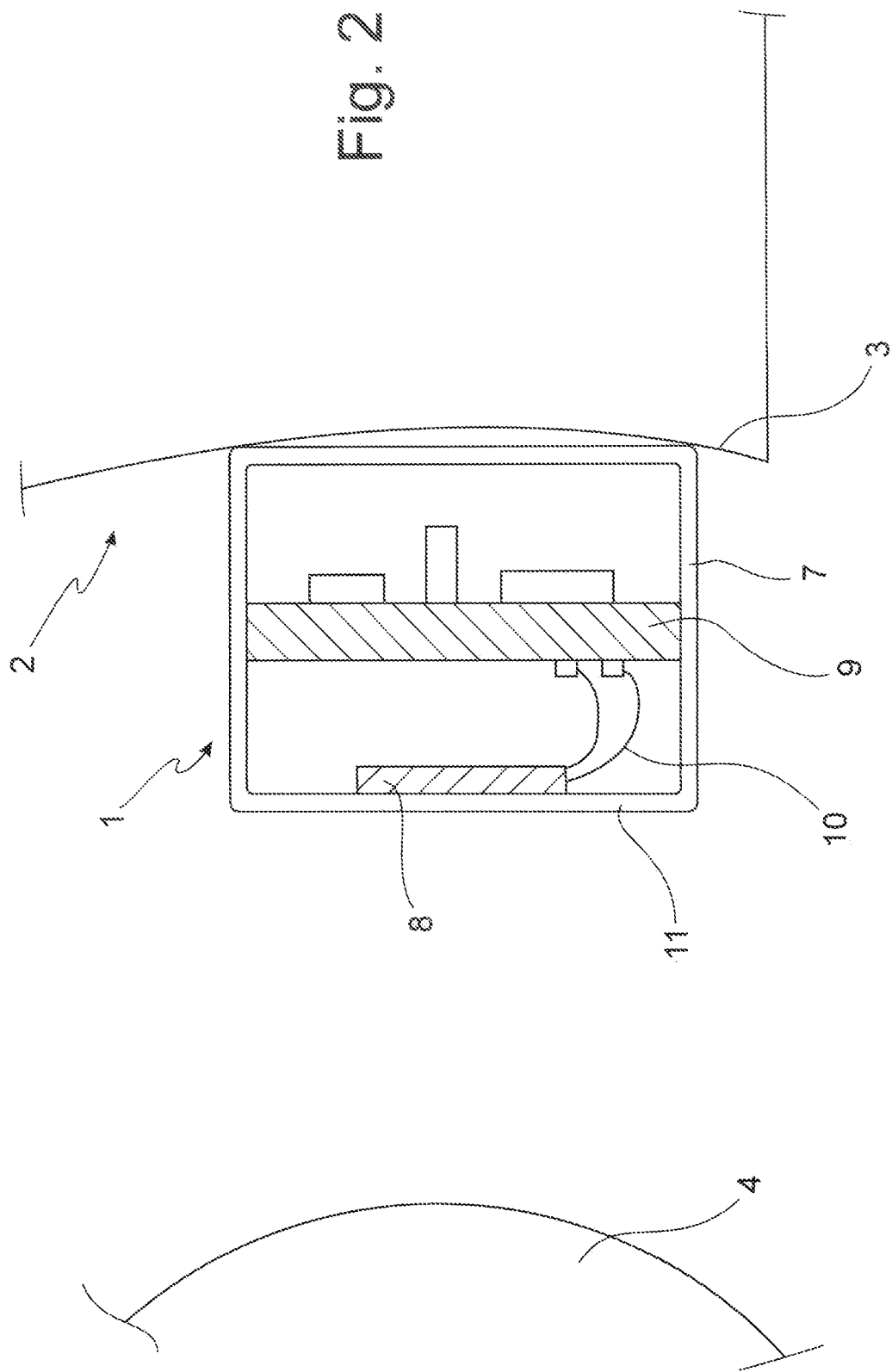
FIG. 2: shows a cross section of the sensor device arranged in a wheel arch.

In FIG. 2, a cross section of the sensor device 1 arranged in a wheel arch 3 is illustrated. The sensor device is arranged counter to the direction of travel of the vehicle 1 behind the wheel 4 in the region of the wheel arch 3 close to the roadway, that is to say in the region of the base plate of the vehicle 2. The sensor device 1 has a housing 7, in which a structure-borne sound sensor 8 and a circuit carrier 9 are arranged. The structure-borne sound sensor 8 has a signal-conducting connection 10 to the circuit carrier 9. The structure-borne sound sensor 8 can for example be constructed as a piezoelectric film. The structure-borne sound sensor 8 has an extensive contact with a flat constructed housing area 11. The housing area 11 faces the running surface 12 of the wheel 4. The spray water 6 thrown up by the wheel 4 in the case of a wetted roadway impacts onto the flat constructed housing area 11 and sets the same vibrating. The vibrations can be detected in the form of a structure-borne sound signal by the structure-borne sound sensor 8. Because the housing 7 has a cavity, the housing area 11 can act as a resonator surface, which amplifies the structure-borne sound signals. The housing 7 therefore act as a resonant body. The circuit carrier 9 only has a connection to the housing 7 at the edges of the circuit carrier. As a result, vibrations, which occur during the driving of the vehicle 2, are not transmitted at full-strength to the circuit carrier 9. The housing 7 can for example be connected to the wheel arch 3 by means of screw or adhesive connections.

Figure 3:
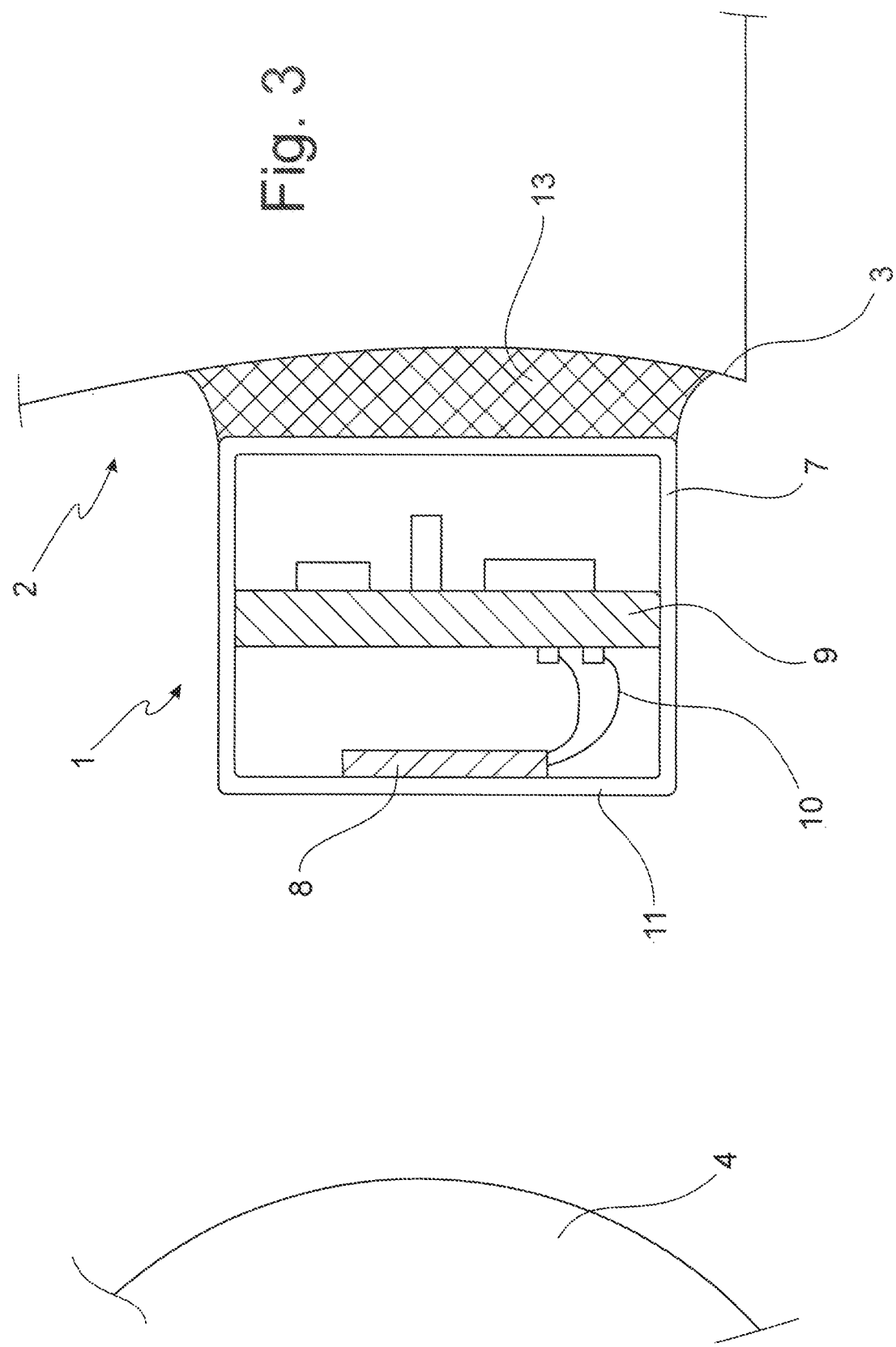
FIG. 3: shows a cross section of a sensor device mounted in a wheel arch by means of an adhesive connection.

In FIG. 3, a sensor device 1 according to FIG. 2 is illustrated mounted in a wheel arch 3 of a vehicle 1. The sensor device 1 is connected to the wheel arch 3 by means of an adhesive connection 13. In this case, the adhesive connection 13 has a vibration damping action. As a result, vibrations, which occur during the driving of the vehicle 1, are damped, so that the sensor device 1 is protected from the shocks.

Figure 4:
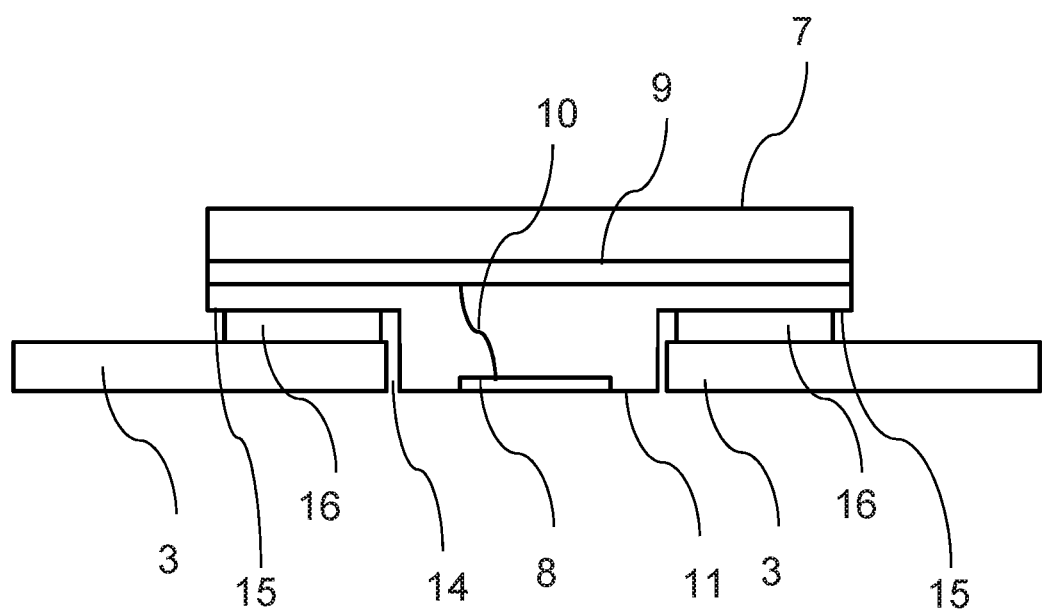
FIG. 4 shows the sensor device according to the invention in an alternative embodiment.

An alternative embodiment of the invention is illustrated in FIG. 4, which is provided for mounting in an opening 14 in a wheel arch 3. The housing 7 is inserted into the opening 14 in certain sections. Preferably, the flat constructed housing area 11 here forms a flush plane with the inner wall of the wheel arch 3. The structure-borne sound sensor 8 is arranged on the inside of the housing area 11. The housing 7 has a lateral protrusion 15, which is provided for resting with the wall of the wheel arch 3. The lateral protrusion 15 of the housing 7 and the edging of the opening 14 of the wheel arch 3 form an overlap. A connecting means 16 is arranged between the lateral protrusion 15 and the wheel arch 3. The connecting means 16 is preferably constructed flat and has an adhesive film on both sides for producing an adhesive connection 13 between the housing 7 and the wheel arch 3. The connecting means 16 is preferably produced from a foamed plastic material. The foamed plastic material is here realized in an elastic manner, so that the adhesive connection 13 produced by the connecting means 16 has a vibration-damping action. By constructing the lateral protrusion 15 and using a vibration damping connecting means 16, a fast and simple mounting of the housing 7 into an opening 14 of a wheel arch 3 is enabled.

All of the features mentioned in the preceding description and in the claims can be combined in any desired selection with the features of the independent claims. The disclosure of the invention is therefore not limited to the described or claimed feature combinations, rather all sensible feature combinations in the context of the invention are to be considered as disclosed.

The invention claimed is:

1. A sensor device for detecting moisture on a roadway of a vehicle, comprising:
   a housing having at least one flat housing area, the housing being constructed as a resonant body and the housing being provided for mounting in a wheel arch of the vehicle;
   at least one circuit carrier arranged in the housing;
   at least one structure-borne sound sensor arranged in the housing area of the housing and connected in a signal-conducting matter to the circuit carrier; and
   at least one connecting means assigned to the housing for producing a connection between the housing and the wheel arch, the at least one connecting means being constructed to be vibration damping, at least in certain sections, and constructed for receiving a decoupling of the sensor device and the wheel arch,
   wherein the at least one connecting means is constructed for producing a connection between the housing and the wheel arch,
   wherein the housing has a lateral protrusion extending outward from a top surface of the housing, and
   wherein the at least one connecting means is a double-sided adhesive tape having a first side directly adhered to the lateral protrusion and a second side directly adhered to the wheel arch.

2. The sensor device according to claim 1, wherein the structure-borne sound sensor has an extensive contact with the housing area which is constructed to be flat and the structure-borne sound sensor is arranged on the side of the housing area facing an interior of the housing.

3. The sensor device according to claim 1, wherein at least one structure-borne sound sensor is a piezoelectric element.

4. A sensor device for detecting moisture on a roadway of a vehicle, comprising:
   a housing having at least one flat housing area, the housing being constructed as a resonant body and the housing being provided for mounting in a wheel arch of the vehicle;
   at least one circuit carrier arranged in the housing;
   at least one structure-borne sound sensor arranged in the housing area of the housing and connected in a signal-conducting matter to the circuit carrier; and
   at least one connecting means assigned to the housing for producing a connection between the housing and the wheel arch, the at least one connecting means being constructed to be vibration damping, at least in certain sections, and constructed for receiving a decoupling of the sensor device and the wheel arch,
   wherein the circuit carrier is connected to the housing in a vibration-damped manner,
   wherein the housing has a lateral protrusion extending outward from a top surface of the housing, and
   wherein the at least one connecting means is a double-sided adhesive tape having a first side directly adhered to the lateral protrusion and a second side directly adhered to the wheel arch.

5. The sensor device according to claim 1, wherein the circuit carrier is only connected to the housing at edges of the circuit carrier.

6. The sensor device according to claim 1, wherein the connecting means is connected flat.

7. The sensor device according to claim 1, wherein the housing is constructed for mounting in at least one opening of the wheel arch.

8. The sensor device according to claim 1, wherein a plane spanned by the lateral protrusion and a plane spanned by the flat housing area are arranged parallel to one another.

9. A vehicle, comprising:
at least two axles, having at least two wheels, the wheel arch surrounding at least one wheel of the at least two wheels at least in certain sections; and
the sensor device according to claim 1, wherein the sensor device is arranged in the wheel arch.

10. The vehicle according to claim 9, wherein the at least one flat housing area of the housing is arranged in the wheel arch facing a running surface of one wheel of the at least two wheels, and
wherein the sensor device is arranged counter to a direction of travel of the vehicle behind the one wheel.

11. The vehicle according to claim 9, wherein the sensor device is arranged in the region of the wheel arch close to the roadway.

12. The vehicle according to claim 9, wherein the at least one flat housing area of the sensor device is inserted into an opening in a wheel arch at least in certain sections.

13. The sensor device according to claim 1, wherein the at least one structure-borne sound sensor is a piezoelectric film.

14. A sensor device for detecting moisture on a roadway of a vehicle, comprising:
a housing having at least one flat housing area, the housing being constructed as a resonant body and the housing being provided for mounting in a wheel arch of the vehicle;
at least one circuit carrier arranged in the housing;
at least one structure-borne sound sensor arranged in the housing area of the housing and connected in a signal-conducting matter to the circuit carrier; and
at least one connecting means assigned to the housing for producing a connection between the housing and the wheel arch, the at least one connecting means being constructed to be vibration damping, at least in certain sections, and constructed for receiving a decoupling of the sensor device and the wheel arch,
wherein the circuit carrier is connected to the housing in a vibration-damped manner, wherein the at least one connecting means is constructed for producing a connection between the housing and the wheel arch,
wherein the housing has a lateral protrusion extending outward from a top surface of the housing, and
wherein the at least one connecting means is a double-sided adhesive tape having a first side directly adhered to the lateral protrusion and a second side directly adhered to the wheel arch.

15. The sensor device according to claim 1, wherein the structure-borne sound sensor is configured to detect vibrations caused by impacting water on the housing.

\* \* \* \* \*